US008116783B2

(12) United States Patent
Duxbury et al.

(10) Patent No.: US 8,116,783 B2
(45) Date of Patent: Feb. 14, 2012

(54) METHOD AND APPARATUS FOR DETERMINING THE LOCATION OF A WIRELESS CLIENT DEVICE ON A WIRELESS NETWORK

(75) Inventors: Guy Duxbury, Nepean (CA); Andrew Paryzak, Ottawa (CA)

(73) Assignee: Rockstar Bidco LP, New York, NY (US)

( * ) Notice: Subject to any disclaimer, the term of this patent is extended or adjusted under 35 U.S.C. 154(b) by 364 days.

(21) Appl. No.: 11/525,641

(22) Filed: Sep. 22, 2006

(65) Prior Publication Data

US 2008/0076447 A1    Mar. 27, 2008

(51) Int. Cl.
H04W 24/00    (2009.01)
H04M 11/04    (2006.01)

(52) U.S. Cl. ............... 455/456.1; 455/404.2; 455/456.5

(58) Field of Classification Search ........ 455/456.1–457
See application file for complete search history.

(56) References Cited

U.S. PATENT DOCUMENTS

| | | | |
|---|---|---|---|
| 6,678,208 B2 * | 1/2004 | Sifferman et al. | 367/89 |
| 7,043,255 B1 * | 5/2006 | Tiwari | 455/456.1 |
| 7,233,800 B2 * | 6/2007 | Laroia et al. | 455/456.1 |
| 7,342,483 B2 * | 3/2008 | Oesterling et al. | 340/426.2 |
| 7,366,202 B2 * | 4/2008 | Scherzer et al. | 370/480 |
| 2002/0097182 A1 * | 7/2002 | Goren et al. | 342/357.07 |
| 2003/0028294 A1 * | 2/2003 | Yanagi | 701/21 |
| 2003/0135613 A1 * | 7/2003 | Yoshida et al. | 709/224 |
| 2005/0047395 A1 * | 3/2005 | Narin et al. | 370/352 |
| 2007/0194923 A1 * | 8/2007 | Karr | 340/572.1 |

\* cited by examiner

*Primary Examiner* — Michael Thier
(74) *Attorney, Agent, or Firm* — Anderson Gorecki & Manaras LLP

(57) ABSTRACT

The rate at which a particular wireless client may be PINGed may depend on many factors, including the accuracy with which the location of the wireless client is required to be known, how accurate the system has historically been able to locate other previous clients in the same general area; the speed with which the client is moving, the amount of other data being transmitted by the client, the needs of other clients being serviced by the access point that will need to PING the client, the current battery life of the client, and the priority of obtaining an accurate location for a particular wireless user verses other uses of the network bandwidth. Based on the multiple factors considered by the system, the rate at which the client will be PINGed is adjusted to optimize the amount of bandwidth used to determine the client's location.

13 Claims, 3 Drawing Sheets

METHOD AND APPARATUS FOR DETERMINING THE LOCATION OF A WIRELESS CLIENT DEVICE ON A WIRELESS NETWORK

BACKGROUND

1. Field

This application relates to communication networks and, more particularly, to a method and apparatus for determining the location of a wireless client device on a wireless network.

2. Description of the Related Art

Data communication networks may include various network elements, such as routers and switches, configured to facilitate the flow of data through the network. Networks may also include other network elements, such as computers and printers, configured to receive and transmit data over the network.

Network elements may have different levels of intelligence, depending on the particular manner in which the network element is intended to operate on the network. For example, a network element may be relatively intelligent and configured to execute software to enable particular applications to be run on the network element, so that the network element can provide services on the network. Alternatively, the network element may be provided with less intelligence and configured to perform a particular service on the network. An example of a less intelligent network element may be a printer connected to the network and configured to provide print services on the network. Optionally, different network elements may work together to collectively provide services on the network.

In a wireless network, it may be necessary or desirable to determine the location of active wireless client devices to enable services to be provided to those clients. For example, the network operator may want to know where active devices are located so that the wireless client is able to have access to nearby printing and other localized services. Likewise, the network operator may want to monitor the wireless clients to prevent rogue devices from accessing the network or to prevent people from being in particular areas of the building.

The location of a wireless client may be determined by causing the wireless client devices to measure the power they receive from several access points that they can see and transmit the power measurements back up into the network. Since all WLAN access points regularly broadcast synchronization and identification data, there is generally plenty of signal for the wireless client to measure, which provides for a relatively fast location determination. One of the benefits of this method is that it does not require significant additional data to be transmitted on the network—the measurement is performed by looking at data that is already commonly transmitted on the network. A disadvantage of this method, however, is that the client is required to run a non-standardized application, which can use up memory and power on the client device. Additionally, a new client or driver may need to be written for each type of client device, which may make it difficult to implement. Moreover, if the client device does not have the requisite application or if the application has been disabled, the network is not able to track the client device.

Another way to determine a location of a wireless client is to measure the signal strength and or transmitted wave angle from the clients either at the access points or using dedicated signal measurement receivers or arrays of receivers. In general, the greater the amount of information that the wireless client transmits, the faster the network is able to determine the location of the wireless client device. While this works well when the client is transmitting, a client that is not currently transmitting will not be seen by the network. Since clients are only required to transmit occasional messages to maintain an association with an access point, this method may have very little information on which it may make a location determination. Thus, this method may make it difficult to find particular client devices that are not actively transmitting on the network.

One way of increasing the amount of information transmitted by the wireless client is to periodically PING (Packet InterNetwork Groper) the wireless clients on the network. PING is implemented in virtually all IP capable devices, so no new software needs to be written to enable PING to be used to locate wireless client devices. PING is described in some detail in IETF RFC 1739, and basically uses a series of Internet Control Message Protocol (ICMP) echo messages that are transmitted by both the wireless client and the access points. Since a wireless client will respond to a PING, and hence transmit data on the network when PINGed, PING may be used to increase the transmission rate of a wireless client so that its location may be determined.

Conventionally networks have been configured to PING wireless clients at set intervals so that the location of those clients may be determined on the network. Unfortunately, the use of PING in this manner may use considerable network bandwidth, and hence may affect the overall data performance of the network. Since PING requires the wireless client device to respond by transmitting a response, the use of PING may affect the battery life of the wireless client device. Accordingly, it would be advantageous to improve the manner in which the location of a wireless client device may be determined on a wireless network.

SUMMARY OF THE DISCLOSURE

A method and apparatus for determining the location of a wireless client device on a wireless network uses adaptive PING to cause the wireless client device to transmit information when needed, rather than at set intervals. As described in greater detail below, the rate at which a particular wireless client may be PINGed may depend on many factors, including the accuracy with which the location of the wireless client is required to be known, how accurate the system has historically been able to locate other previous clients in the same general area, the speed at which the client is moving, the amount of other data being transmitted by the client, the needs of other clients being serviced by the access point that will need to PING the client, and the priority of obtaining an accurate location for a particular wireless user verses other uses of the network bandwidth. Other considerations may be used as well and the invention is not limited to a system that uses only these considerations or to a system that uses all of these listed considerations. Based on the multiple factors considered by the system, the rate at which the client will be PINGed is adjusted to optimize the amount of bandwidth used to determine the client's location.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the rate at which a particular wireless client may be PINGed may depend on many factors, including the accuracy with which the location of the wireless client is required to be known, how accurate the system has historically been able to locate other previous clients in the same general area, the speed with which the client is moving, the amount of other data being transmitted by the client, the needs of other clients being serviced by the access point that will need to PING the client, and the priority of obtaining an accurate location for a particular wireless user verses other uses of the network bandwidth. Other considerations may be used as well and the invention is not limited to a system that uses only these considerations or to a system that uses all of these listed considerations. Based on the multiple factors considered by the system, the rate at which the client will be PINGed is adjusted to optimize the amount of bandwidth used to determine the client's location.

Figure 1:
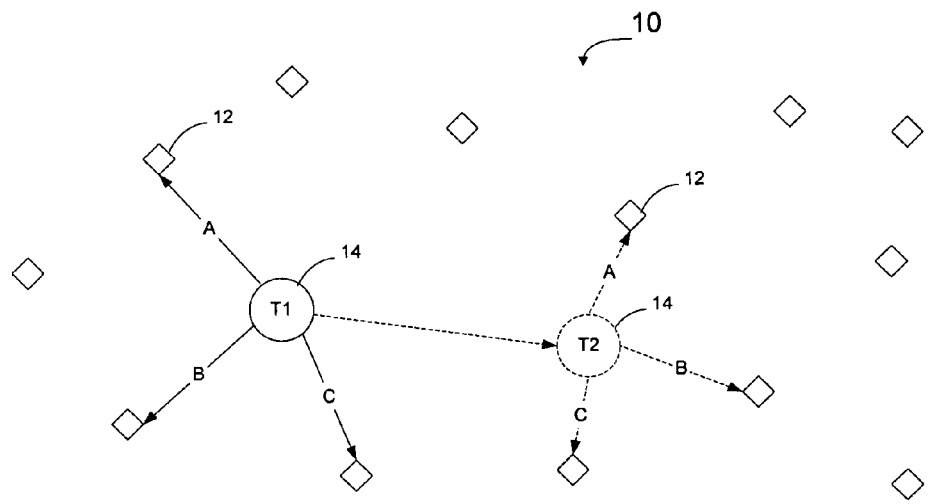
FIG. 1 is a functional block diagram of an example of a communication network having multiple wireless access points and wireless clients.

FIG. 1 shows an of a wireless communication network 10 having multiple wireless access points 12 and wireless clients 14. If the wireless client 14 is not transmitting data to the wireless access points 12, the network 10 will not know the location of the wireless client 14. However, when the wireless client transmits data, as shown by arrows A, B, C, the wireless network may measure the strength (and optionally direction) of the signals received by access points in the vicinity of the client to determine where the wireless client 14 is in the network. Transmission of a larger amount of data by the wireless client enables the network to locate the wireless client more quickly.

As the wireless client moves through the network for example as shown in FIG. 1, the wireless client 14 will be in a first location at time T1 and at a second location at time T2. By measuring the signal strength of transmissions at the same or different access points as the wireless client moves through the network, the wireless client may be located so that services may be provided to the wireless client. In the example shown in FIG. 1, the wireless client is visible to a first set of access points at time T1 and visible to a second set of access points at time T2. Each set of access points may measure the signal strength of transmissions from the wireless client and either use the information directly or transmit the measured signal strength to a location system that may correlate the several signal strengths to determine the location of the wireless client.

Figure 2:
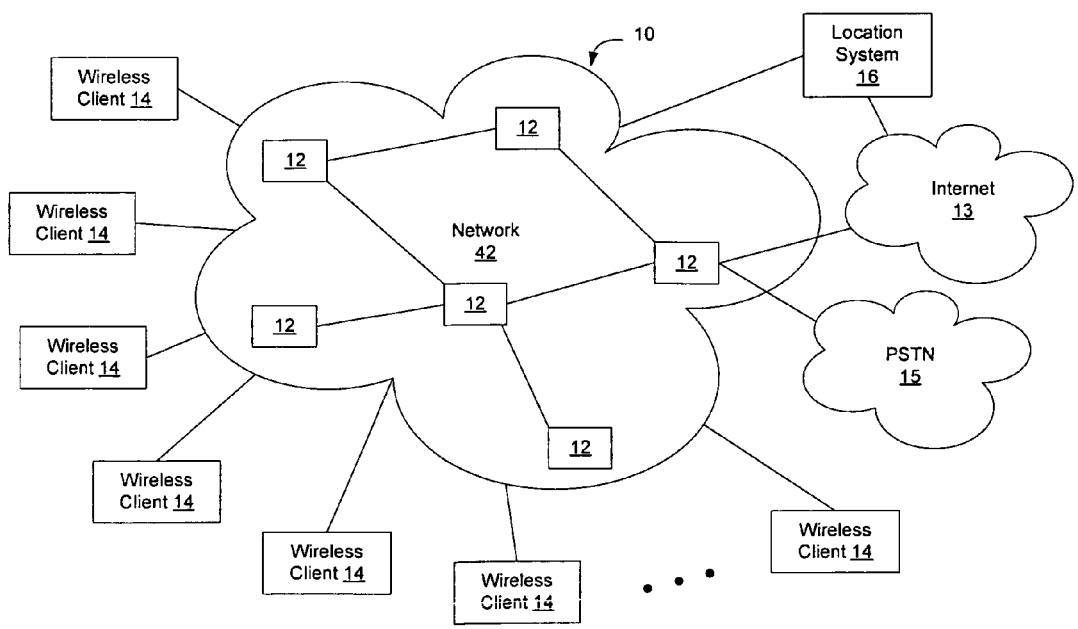
FIG. 2 is a functional block diagram of an example of a communication network having multiple wireless access points, wireless clients, and a location system configured according to an embodiment of the invention.

FIG. 2 shows a network 10 of access points 12 configured to communicate with each other and with other external networks such as the Internet 13 or Public Switched Telephone Network (PSTN) 15. A location system 16 is connected to the network 10 either directly or via another network such as the Internet 13 and configured to determine the location of the wireless clients in the network 10. The location of the wireless clients may be used to enable a wide range of location enabled services including directions, enhanced security, dynamic team forming, associated phone calling, and other types of services to be provided to the wireless clients and to detect when one or more of the wireless clients is in a restricted area.

The location system 16 may be implemented on a computer such as a network server, may be implemented as a process on a router or other network device, or may be implemented in a distributed manner. Although an embodiment of the location system will be described in greater detail below in connection with FIG. 3, the invention is not limited to a location service that is configured as shown in this example or to any particular way in which the location system is implemented.

Figure 3:
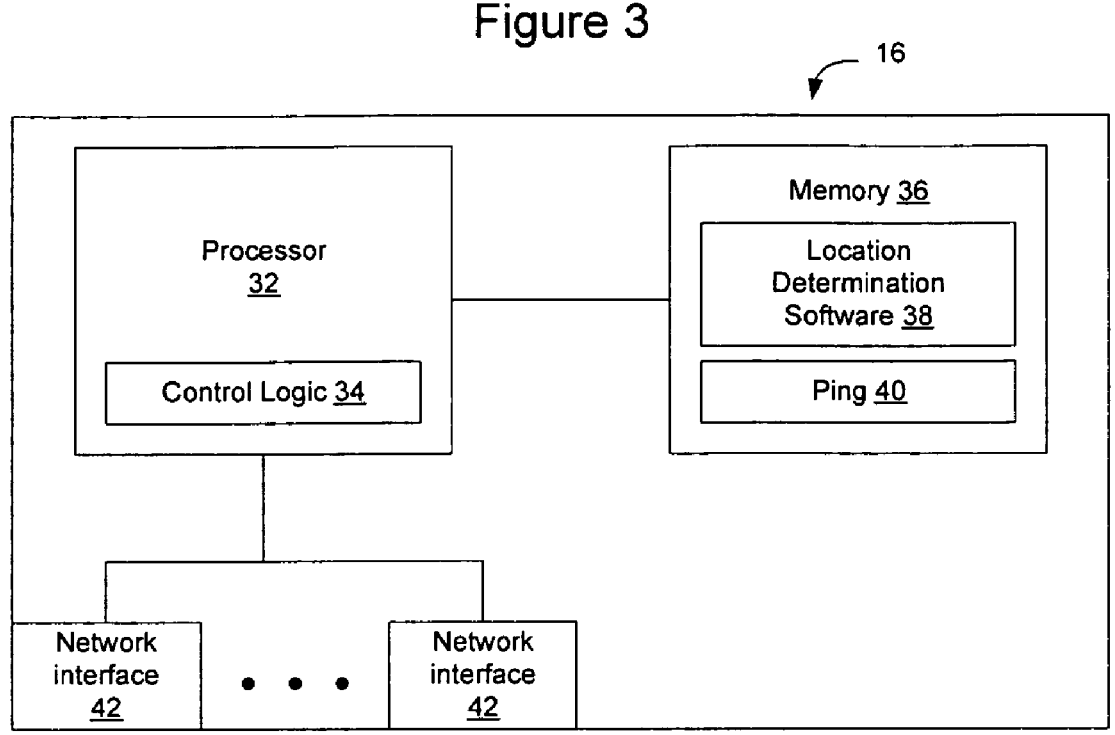
FIG. 3 is a functional block diagram of a location system containing location determination software configured according to an embodiment of the invention.

In the example shown in FIG. 3, the location system is implemented in a computer 30 having a processor 32 containing control logic 34 that is configured to execute software that has been loaded onto the computer. The computer 30 includes a memory 36 containing location determination software 38 configured to determine how fast wireless clients should be PINGed to enable their location to be determined. Additional details about how location determination software 38 operates is set forth below and discussed in connection with FIGS. 4 and 5. The location determination software 38 may be part of a larger network management program or may be a stand-alone computer program.

The memory 36 may also include many other software modules, such as a PING module 40, configured to enable the computer 30 to PING the wireless clients or to communicate with the access points to cause the access points to PING the wireless clients. PING module 40 may be part of a larger IP stack or another computer program on the computer 30. The invention is not limited to the particular manner in which the computer interacts with the access points to cause the wireless clients to be PINGed.

The computer 30 may also include many other standard computer components, such as network interfaces 42, as is well known in the art. Since computers themselves are well known in the art, a detailed description of the remaining components has been omitted to avoid obfuscating the invention.

Figure 4:
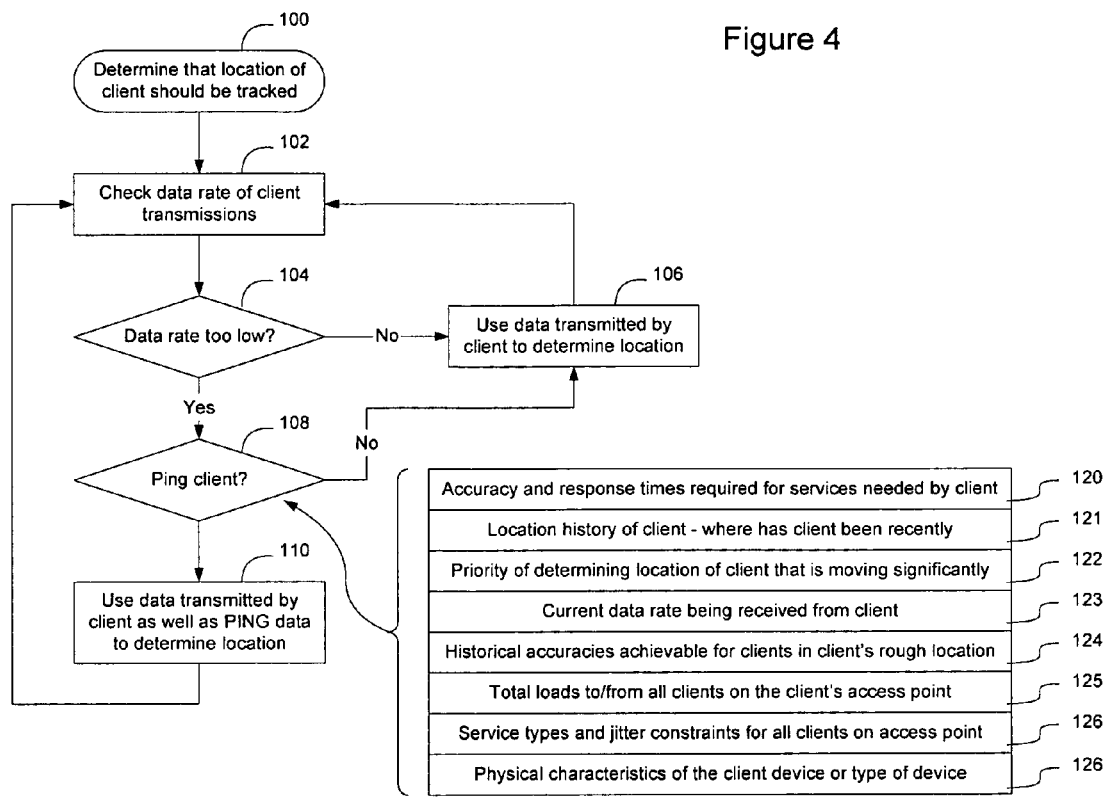
FIG. 4 is a flow chart illustrating a process of determining a PING rate to determine wireless client location according to an embodiment of the invention.

FIG. 4 is a flow chart illustrating a process of determining a rate at which wireless clients should be PINGed to enable the location determination service to determine their locations according to an embodiment of the invention. As shown in FIG. 4, when the Location Determination Software (LDS) determines that the location of a wireless client should be tracked (100), the LDS will check the data rate of the client transmissions (102) and determine if the data rate is too low to make an accurate and/or timely decision (104).

If the data rate of data being transmitted by the client is not too low, the LDS will use signal strength from the data being transmitted by the client to determine the location of the client (106). Although in this embodiment the data rate (106) is used to determine whether the location determination system has sufficient information to make a location determination, the invention is not limited in this manner as other measurements may be used instead during this step.

Similarly, the invention is not limited by the particular way in which the LDS determines that the location of a client should be tracked (100) as many different events may cause the LDS to determine that a particular client should be tracked. For example, the LDS may be scheduled to check the location of each client periodically, at each hand-off, or upon the occurrence of other types of events.

If the LDS determines that it is necessary to PING the client (108) the LDS will cause a PING to be sent to the client over the network 10. The PING process causes the wireless client 14 to transmit data, which may then be used (110) by the location system to determine the location of the wireless client on the network.

According to an embodiment of the invention, the LDS may decide to PING a client or adjust a frequency at which a wireless client is to be PINGed so that the location system will PING a wireless client as needed rather than at fixed intervals. This allows the location system to PING the wireless client more frequently when the client is moving rapidly, and less frequently when the client is stationary or moving slowly. Similarly, this allows the location system to PING the wireless client more frequently when the client is not transmitting other data than when the client is already transmitting sufficient other data.

In the embodiment shown in FIG. 4, the LDS will consider multiple factors when making a decision as to whether a wireless client should be PINGed (106). For example, the LDS may learn what services are being offered to the client and determine the accuracy and response times required to enable those services to be provided to the client (120).

The LDS may also consider the location history of the client, i.e. where the client has been recently, to determine a pattern of movement that may be used to anticipate a future location of the client. Where the historical location information indicates that the client is moving slowly, the PING rate may be reduced since the client is unlikely to move significantly in a short period of time. On the other hand, where the historical location information indicates that the client is moving rapidly, the PING rate may be increased to maintain a better understanding of the client's location.

In connection with the location history of the client, the LDS may also implement policy that may be set by a network administrator to consider the priority of determining the location of a client that is moving significantly. It may be that location-based services are less important for a client that is moving rapidly, than they would be for a client that is moving slowly or is stationary. For example, a client that is driving in a car may be less likely to care about available printing services available in a portion of a network than would be a person sitting in an office building. Thus, depending on the policy implemented on the network, the LDS may be configured to limit the rate at which a client is PINGed when the client is moving above a threshold velocity.

The LDS will also look at the current data rate being received from the client 123, for example as discussed in connection with (102) above. Where the client is transmitting significant data the rate at which the client is PINGed may be reduced since measurements based on the client-transmitted data may be used in place of a transmitted response to a network PING to determine the location of the client.

The LDS may also look at the historical accuracies (124) achievable for clients in the client's approximate location (124). For example, as shown in FIG. 1, as a client 14 moves through the network, the client may move from a first location at time T1 to a second location at time T2. The network may have historically been able to locate clients to within a 30 meter accuracy at the location of the client at time T1, but may have historically only been able to locate clients within a 60 meter accuracy at the client at time T2. Understanding the historical ability of the network to determine the location of a client may enable the network to reduce the rate at which the network PINGs a client since it may be futile to attempt to resolve a location more closely than has historically been possible.

Stated another way, the rate at which the wireless client is PINGed may be adjusted so that it is set at a level where a total data rate from the client is at least as much as a pre-measured statistical data rate required to enable the location of the wireless client device to be determined in the current approximate location of the wireless client device. This may be done adaptively in real time based on current location data track error estimates determined from known path obstacles within an area encompassing the current approximate location and generalized data on total data rate versus location determination rate.

The LDS may look at other factors as well, such as what else is happening on the network at the time, and adjust the PING rate based on these factors. For example, the LDS may look at the total loads to/from all clients on the client's access point (125). Where the access point is experiencing a high volume of traffic, the rate at which the access point is requested to PING a particular client may be reduced to avoid using up the valuable scarce bandwidth from that access point. Conversely, where the access point is only lightly loaded, the rate at which the client is PINGed may be increased without adversely affecting transmissions from other wireless clients.

Similarly, the LDS may look at the service types and jitter constraints for all clients on the access point. Understanding the service types and jitter constraints, and optionally other factors associated with other client's needs, may enable the LDS to reduce the PING rate where an excessive use of PING may disrupt the other client's ability to continue receiving their services.

The LDS may also consider the physical characteristics 127 of the client device or type of device being used to implement the client, and adjust the PING rate to accommodate limitations associated with the physical device. One of the physical characteristics that may be considered includes the average battery life for the physical device being used to implement the client, and any client specific information regarding the battery power of the particular client. Other characteristics may be used as well and the invention is not limited to an implementation where the only physical characteristic considered by the LDS is the battery life of the wireless client device.

Figure 5:
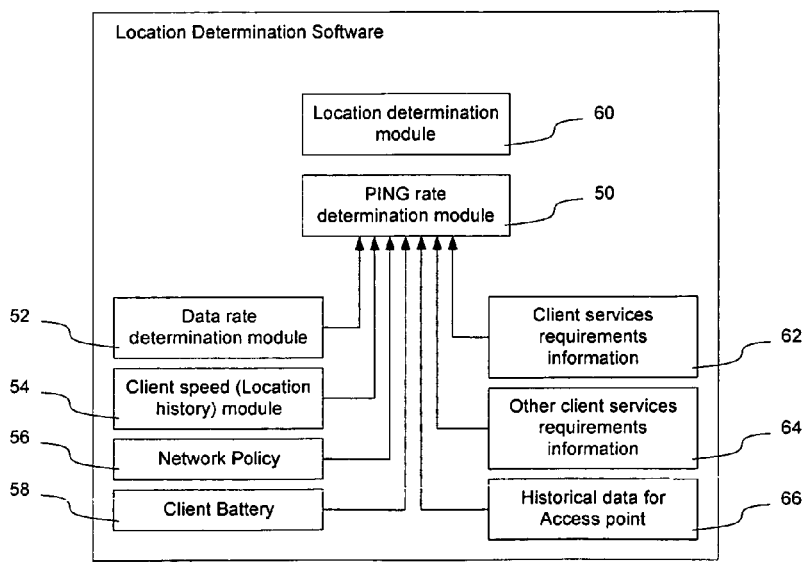
FIG. 5 is a functional block diagram showing several functional modules of an example of location determination software that may be implemented according to an embodiment of the invention.

FIG. 5 is a functional block diagram showing several functional modules of an example of location determination software that may be implemented according to an embodiment of the invention. As shown in FIG. 5, the location determination software 38 has a PING rate determination module 50 configured to determine when a particular client should be PINGed so that PING-related transmissions from the client may be used to determine its location. The PING rate determination module may determine a frequency with which the client should be PINGed, may determine particular instances that the client should be PINGed, or may be otherwise configured to determine or adjust how PING is used to obtain location information of the client.

The LDS may also include a location determination module 60 configured to operate in a conventional manner to receive information from the access points and use that information to determine the location of the wireless clients on the network. The invention is not limited to a location determination module that operates in any particular manner, as many different types of location determination modules may be used to determine the location of the wireless clients once the wireless clients have been PINGed.

The PING rate determination module 50 receives inputs from multiple sources to enable it to determine when a client should be PINGed (108). For example, the PING rate determination module 50 receives information from the data rate determination module 52 indicative of how much data the client is transmitting on the network. The PING rate determination module 50 also receives input from the client history (location history) module 54 that enables the PING rate determination module to determine how fast the client is moving and apply network policy 56 from a network policy module 56 to determine how accurate it should attempt to locate a client moving at this velocity.

The network policy module 56 may enable a network administrator to specify how the location determination software should operate. For example, a network administrator may specify the precision required for various services, the speed with which the network location should be determined, the maximum amount of bandwidth to be used for location determination services, and other network and location related aspects of how the LDS should operate on the network. The invention is not limited to a particular set of policies and the example policies set forth herein are intended to be examples only, and not to limit the invention.

The PING rate determination module 50 may consider physical characteristics of the type of device being used to implement the client, and may alter the rate at which the client is PINGed based on the type of device. For example, different types of clients may have different battery lives, and may use different amounts of power to transmit data on the network. The PING rate determination module may take into account the average battery life of network devices of the type being used to implement the wireless client, the amount of time the wireless client has been active on the network, and optionally any indication received from the wireless client indicative that the wireless client's battery is running low on power. Based on these considerations, the PING rate determination module may adjust the PING rate to reduce the PING rate to a level lower than it would ordinarily be to conserve battery life on the wireless client device.

The PING rate determination module 50 may also consider information in connection with making a PING rate determination. For example, the PING rate determination module receives information regarding client service requirements 62 so that it may determine, for a given client engaged in particular activities or receiving particular services, the relative importance of location to that client. This information may then be used adjust how frequently the wireless client is PINGed so that the wireless client's location may be established given the level of interaction between that client and the network.

The PING rate determination module 50 may also receive information relating to other client services requirements (64) so that the PING rate determination module may adjust the PING rate according to current or anticipated network conditions. The PING rate determination module may also receive historical data (66) such as network calibration data and other historical information related to the ability to determine client location in this area of the network. This enables the PING rate determination module 50 to adjust the PING rate according to geographical area so that it can adjust the PING rate based on the historical location accuracy for the area of the network where the wireless client is currently located. The PING rate determination module may also receive other information as well that will enable it to adjust the PING rate that is used to PING a client to cause the client to transmit information that may then be used to determine the client's location.

The PING rate determination module 50 may also receive information relating to other client services requirements (64) so that the PING rate determination module may adjust the PING rate according to current or anticipated battery life of a client with a slight compromise of location accuracy determination rate.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation but rather extends to all manners of implementing the functions described herein in connection with the location determination software 38 and the location system 16.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining a location of a wireless client device on a wireless network, the method comprising the steps of:

determining whether a data rate of transmission of the wireless client device is sufficiently high to determine the location of the wireless client device on the wireless network with sufficient speed and accuracy; and if the data rate of transmission of the wireless client device is not sufficiently high, determining how frequently to send a PING message to the wireless client device to cause the wireless client device to transmit data in response to receipt of the PING message to cause the data rate of transmission of the wireless client device to be increased to enable the location of the wireless client device to be determined with sufficient speed and accuracy;

wherein the step of determining how frequently to PING the wireless client device comprises adjusting how frequently a PING message is sent to the wireless client device;

wherein the step of determining how frequently to PING the wireless client device causes a rate at which the wireless client device is PINGed to be set at a level where a total data rate from the client is at least as much as a pre-measured statistical data rate required to enable the location of the wireless client device to be determined in a current approximate location of the wireless client device; and wherein the step of determining how frequently to PING the wireless client device is done adaptively in real time based on current location data track error estimates determined from known path obstacles within an area encompassing the current approximate location and generalized data on total data rate versus location determination rate.

2. The method of determining a location of a wireless client device on a wireless network of claim 1, wherein the step of determining how frequently to PING the wireless client device comprises considering historical accuracies achievable for other wireless client devices in a general geographic area encompassing the current approximate location of the wireless client device.

3. The method of determining a location of a wireless client device on a wireless network of claim 1, wherein the step of determining how frequently to PING the wireless client device comprises considering an accuracy and response time required for services needed by the wireless client device.

4. The method of determining a location of a wireless client device on a wireless network of claim 1, wherein the step of determining how frequently to PING the wireless client device comprises considering a location history of the wireless client device.

5. The method of determining a location of a wireless client device on a wireless network of claim 1,
wherein the step of determining how frequently to PING the wireless client device comprises considering historical accuracies achievable for other wireless client devices in a general geographic area encompassing an estimated location of the wireless client device and adjusting how frequently to PING the wireless client device based on the historical accuracies.

6. The method of determining a location of a wireless client device on a wireless network of claim 1,
wherein the step of determining how frequently to PING the wireless client device comprises considering physical characteristics of the wireless client device and adjusting how frequently to PING the wireless client device based on the physical characteristics of the wireless client device.

7. The method of claim 6, wherein the physical characteristics include a typical battery life of wireless client devices of a type matching the wireless client device.

8. The method of claim 6, wherein the physical characteristics include a low battery indication from the wireless client device.

9. The method of claim 6, wherein the step of considering the physical characteristics of the wireless client device comprises reducing how frequently the wireless client device is PINGed as compared with how frequently the wireless client device would otherwise be PINGed to conserve a battery life of the wireless client device.

10. The method of claim 1, wherein a PING of a wireless device comprises transmitting at least a first message to the wireless client on the wireless network to cause the wireless client to transmit at least a second message on the wireless network.

11. A method of determining a location of a wireless client device on a wireless network, the method comprising the steps of:
determining whether a data rate of transmission of the wireless client device is sufficiently high to determine the location of the wireless client device on the wireless network with sufficient speed and accuracy; and
if the data rate of transmission of the wireless client device is not sufficiently high, determining how frequently to send a PING message to the wireless client device to cause the wireless client device to transmit data in response to receipt of the PING message to cause the data rate of transmission of the wireless client device to be increased to enable the location of the wireless client device to be determined with sufficient speed and accuracy;
wherein the step of determining how frequently to PING the wireless client device comprises adjusting how frequently a PING message is sent to the wireless client device;
wherein the step of determining how frequently to PING the wireless client device comprises considering a velocity of the wireless client device; and
wherein the step of considering a velocity of the wireless client device comprises considering a priority of determining a location accuracy of a wireless client device, how fast the client is moving, and a proximity of the wireless client device to one or more critical locations.

12. A method of determining a location of a wireless client device on a wireless network, the method comprising the steps of:
determining whether a data rate of transmission of the wireless client device is sufficiently high to determine the location of the wireless client device on the wireless network with sufficient speed and accuracy; and
if the data rate of transmission of the wireless client device is not sufficiently high, determining how frequently to send a PING message to the wireless client device to cause the wireless client device to transmit data in response to receipt of the PING message to cause the data rate of transmission of the wireless client device to be increased to enable the location of the wireless client device to be determined with sufficient speed and accuracy;
wherein the step of determining how frequently to PING the wireless client device comprises adjusting how frequently a PING message is sent to the wireless client device;
wherein the step of determining how frequently to PING the wireless client device comprises considering current network load conditions and relative importance of the transactions being transmitted versus location accuracy requirements, and adjusting how frequently to PING the wireless client device based on the relative importance of the transaction as compared to the location accuracy requirements; and
wherein the current network conditions comprise service types and jitter constraints for other wireless client devices on an access point associated with the wireless client device.

13. The method of determining a location of a wireless client device on a wireless network of claim 12, wherein the current network conditions comprise total load to/from all wireless client devices on an access point associated with the wireless client device.

* * * * *